G. S. BAKER.
MACHINE FOR THE TRANSPORT OF DOUGH.
APPLICATION FILED OCT. 10, 1908.

927,474.

Patented July 13, 1909.
3 SHEETS—SHEET 1.

G. S. BAKER.
MACHINE FOR THE TRANSPORT OF DOUGH.
APPLICATION FILED OCT. 10, 1908.

927,474.

Patented July 13, 1909.

3 SHEETS—SHEET 3.

Witnesses:

Inventor
George Samuel Baker
by
Attorney

UNITED STATES PATENT OFFICE.

GEORGE SAMUEL BAKER, OF WILLESDEN JUNCTION, LONDON, ENGLAND.

MACHINE FOR THE TRANSPORT OF DOUGH.

No. 927,474.  Specification of Letters Patent.  Patented July 13, 1909.

Application filed October 10, 1908. Serial No. 457,168.

*To all whom it may concern:*

Be it known that I, GEORGE SAMUEL BAKER, subject of the King of England, residing at Willesden Junction, London, England, have invented certain new and useful Improvements in Machines for the Transport of Dough, of which the following is a specification.

This invention relates to machines intended for the transport of divided masses of dough during the operation of proving the dough during bread making and comprises the novel combinations of parts hereinafter described and specifically pointed out in the claims, a preferred embodiment of construction being represented in the accompanying drawings wherein—

Figure 1:
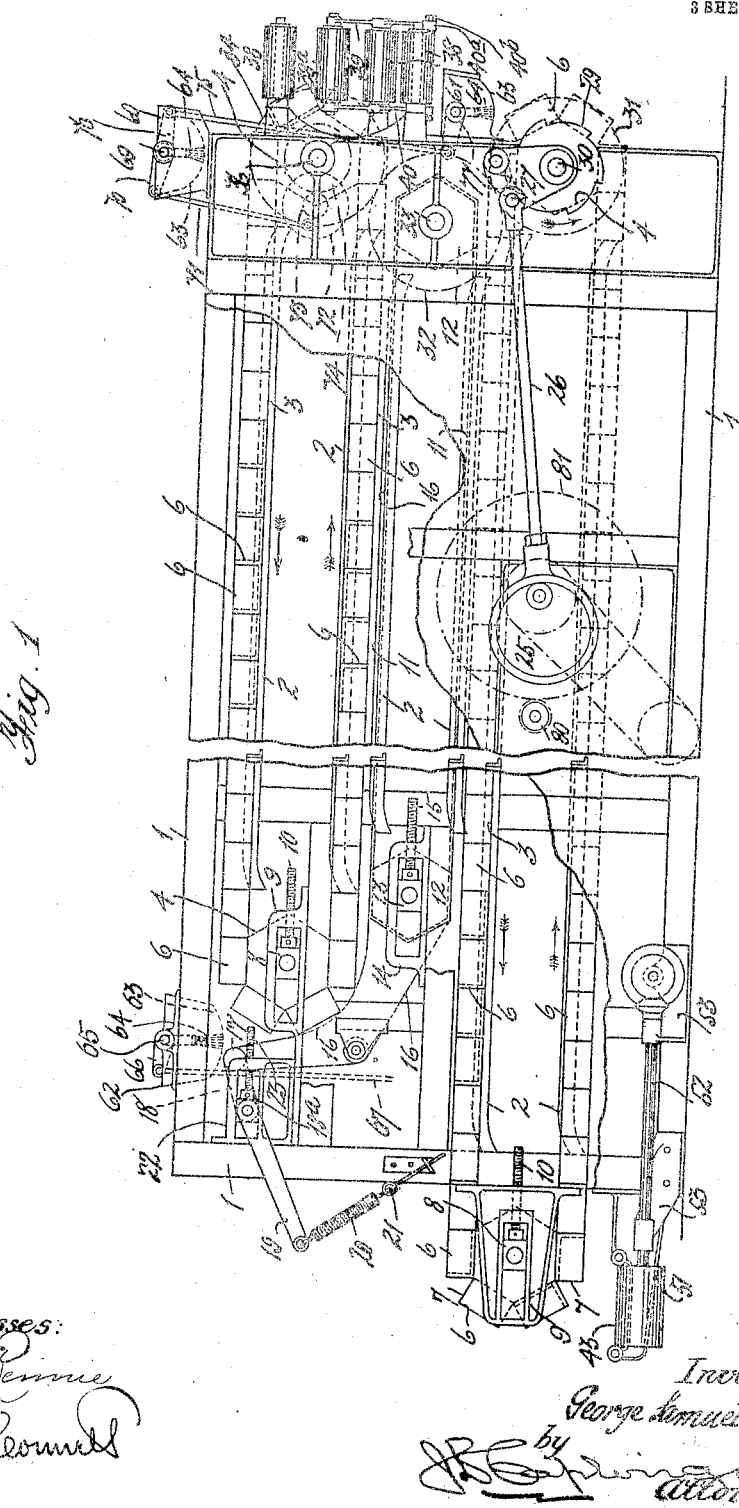
Figure 2:
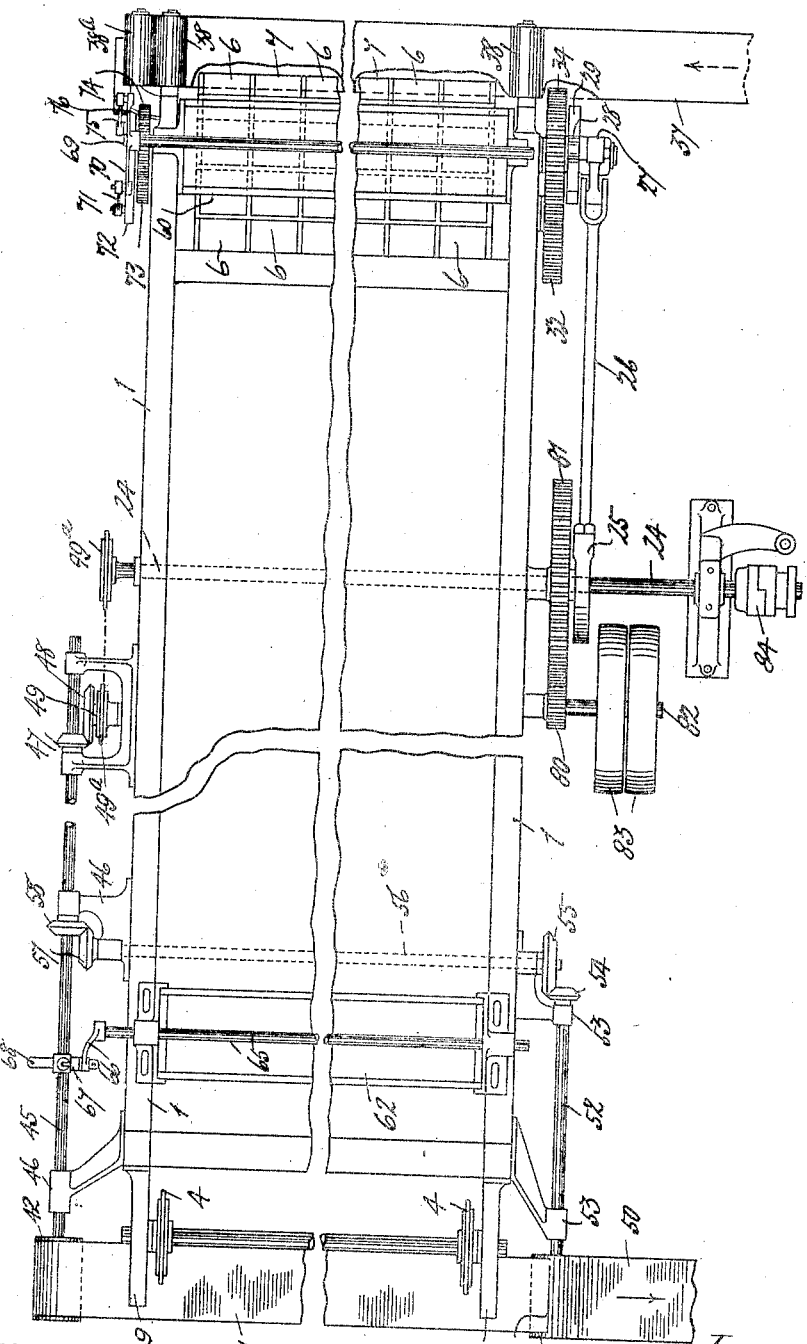
Figure 3:
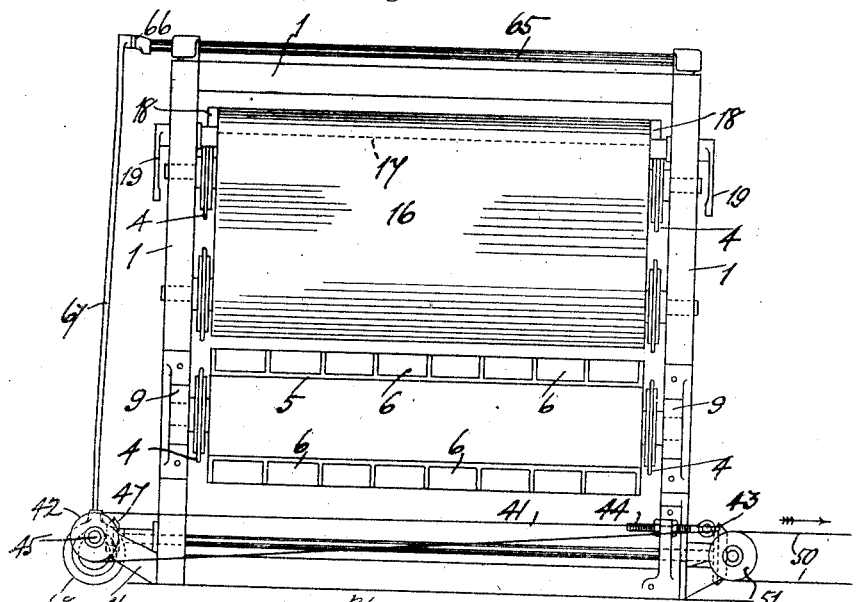
Figure 4:
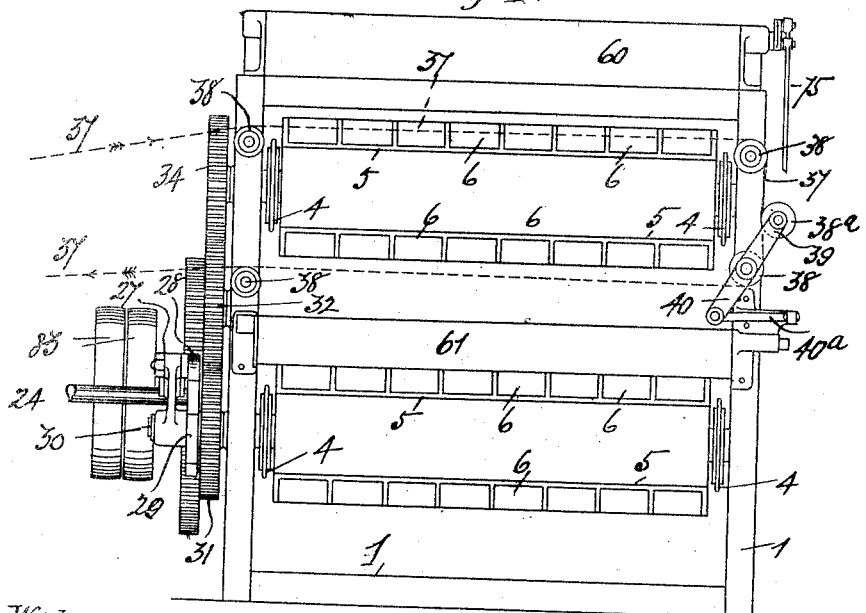

Figure 1 is a broken side elevation of the entire machine, Fig. 2 is a broken plan view thereof, Fig. 3 is an end elevation seen from the left of Fig. 1 and Fig. 4 is an end elevation seen from the right of Fig. 1.

On a suitable frame 1 are mounted pairs of parallel angle irons or other form of rails 2 on which run roller chains 3 and beyond the extremities of said rails are mounted hexagonal wheels 4 about which said chains pass each chain being endless and arranged in pairs supporting the floor plates 5 of the dough receiving boxes 6. The latter lie transversely of the machine as shown in Fig. 2 and each is divided into as many separate compartments as there are separate masses of dough, delivered by a dough dividing machine at each stroke. Each dough receiving box comprises a floor plate 5 and one side wall 6 common to all the compartments, but the latter are open above and at the other side as at 7. The dough receiving boxes are so fixed to their carrying chains 3 that where the chains follow a straight course, the open side of each box is closed by the side wall of the next box (see upper and lower straight chain runs in Fig. 1). By this construction where the chains pass over the wheels 4 the wall of each box takes an angular position to the next box which is equivalent to a widening of the upper part of the dough receiving compartments.

The drawings show a series of boxes mounted in the upper part of the machine side by side and another series carried at a lower level into which the masses of dough from the upper series are delivered as hereinafter explained. One pair of wheels 4 of each series is mounted in bearing blocks 8 capable of sliding in brackets 9 and adjustable by means of screw spindles 10.

The series of dough receiving boxes 6 are preferably placed horizontally as shown and to prevent the dough falling out of the compartments on the lower return run of the series a suitable belt 11 is provided which travels with and closely adjacent to this part of the series, this belt being carried by hexagonal rollers 12 one of which is mounted in adjustable bearing blocks 13 mounted in brackets 14 and adjusted by means of a screw spindle 15. In the drawing the upper series only is shown as provided with such a belt since the delivery of the proved masses of dough takes place from the lower series at the left of the machine as hereinafter explained but where desired or necessary the lower series may also have such a belt according to the point of delivery of the dough. Between the belt and the boxes a canvas web 16 is run which passes around the rollers 12 with the belt 11 and is extended at one end to lie close to the open sides of the boxes where the latter pass from the upper forward to the lower return run of their course (see left hand side of Fig. 1). The said web 16 is supported at its highest part by a tensioning roller 17 mounted on one arm 18 of a double armed lever mounted in a bearing block 18ª and the other arm 19 of which is under the action of a tension spring 20 secured to the frame 1 as by a hook 21. The block 18ª is slidably carried in a bracket 22 and adjustable by means of a screw spindle 23, this construction enabling the tension of the web 16 to be varied by altering the position of the roller 17.

The chains 3 and consequently the dough receiving boxes 6 are actuated from the main driving shaft 24 and given a forward step by step movement by means of an eccentric 25 mounted on said shaft, the rod 26 of which is connected to a sector 27 carrying a pawl 28 engaging the teeth of a ratchet wheel 29 mounted on the shaft 30 of the lower right hand pair of wheels 4. The said shaft 30 carries a gear wheel 31 meshing with a gear wheel 32 carried by the shaft 33 of the right hand roller 12 supporting the belt 11 so that the upper run of said belt is driven in the same direction and at the same speed as the lower run of the upper series of boxes 6. The said gear wheel 32 is in mesh with a gear wheel 34 carried by the shaft 36 of the upper right hand chain wheel 4 whereby the upper series of boxes 6 is driven in the same direction and at the same speed as the lower series.

The two upper series of boxes are fed by hand with the masses of dough which are carried to the feed position by means of a belt 37 supported by rollers 38 mounted on the machine frame the said belt being driven by any suitable means (not shown). A tightening roller 38ª bears upon the belt 37 this roller being carried by arms 39 of double armed levers the other arms 40 of which can be adjusted by means of rods 40ª and nuts 40ᵇ.

The masses of dough in the upper series of boxes 6 are delivered from the lower run thereof when they pass the right hand end of the belt 11 and web 16 into the upper run of the lower series of boxes and are discharged therefrom at the left hand end of the latter on to an endless belt 41 running at a comparatively slow speed. The belt 41 is carried at one end by a knife edge 43 mounted on an adjustable screw spindle 44 for regulating the tension of said belt and at the other end by a roller 42 mounted on a shaft 45 mounted in brackets 46 outside the frame 1 and driven by bevel gears 47, 48 the latter of which is mounted on a shaft 49 actuated by chain and chain wheel gearing 49ª from the main shaft 24. The masses of dough are fed over the knife edge 43 on to a second delivery belt 50 driven at a faster speed than the belt 41, one of the supporting rollers 51 for said latter belt being mounted on a shaft 52 carried in brackets 53 outside the frame 1, and driven by bevel gears 54, 55 the latter of which is mounted on a shaft 56 driven from the shaft 49 by means of bevel gears 57 and 58.

Dusting boxes 60, 61 and 62 are provided for discharging flour or the like onto the dough in the boxes 6 and on to the web 16, these boxes being of any desired construction those shown having convex perforated bottoms 63 over which work brushes 64. The brush in the box 62 over the upper end of the web 16 is mounted on a shaft 65 having a crank arm 66 attached to a rod 67 operated by an eccentric 68 carried by the aforesaid shaft 45 whereby a rocking movement is imparted to said brush. The brush of the dusting box 60 is carried by a shaft 69 having a crank arm 70 to which is attached a connecting rod 71 driven from a wheel 72 operated by gear wheels 73 74, the latter of which is carried by the shaft 36 before referred to, and the brush of the box 61 is operated by connecting rod 75 and crank arms 76, 77 the former of which is carried by the shaft 69.

The shaft 24 is driven through gear wheels 80, 81 from the shaft 82 carrying fast and loose pulleys 83 and said shaft 24 may be provided with clutch mechanism 84 so that it may be connected with and disconnected from a dough dividing machine (not shown).

As previously mentioned if it is desired to deliver the dough at the right hand end of the lower series of boxes or at any position intermediate the ends of such series it is necessary to apply a belt 11 and web 16 adjacent the lower run of said series in such a manner as to prevent the dough falling from the boxes until the delivery point is reached.

What I claim as my invention and desire to secure by Letters Patent of the United States is:—

1. In a machine for the transport of dough the combination of a plurality of superposed endless series of dough receiving boxes lying transversely of the machine and each comprising a series of interconnected compartments having one common side wall and open at the top and remaining side, said boxes being so disposed that when following a straight course the open side of each box is closed by the side wall of the next, a belt arranged adjacent the lower run of the series of inverted boxes to retain the masses of dough therein till they fall into the boxes of the series next below, and a web following the contour of said belt and extended at one end to lie adjacent the open compartments as they pass from the upper to the lower run of the series.

2. In a machine for the transport of dough the combination with an endless series of dough receiving boxes lying transversely of the machine and each comprising a series of interconnected compartments having one common side wall and open at the top and remaining side, said boxes being so disposed that when following a straight course the open side of each box is closed by the side wall of the next, a belt arranged adjacent the lower run of the series of inverted receiving boxes to retain the masses of dough therein, a feed belt from which the dough is delivered by hand to the boxes, and a delivery belt from which the masses of dough fall from the lower run of boxes after passing beyond the end of said belt substantially as described.

3. In a machine for the transport of dough the combination of a plurality of superposed endless series of dough receiving boxes lying transversely of the machine and each comprising a series of interconnected compartments having one common side wall and open at the top and remaining side, said boxes being so disposed that when following a straight course the open side of each box is closed by the side wall of the next, a belt arranged adjacent the lower run of some of the series of inverted boxes to retain the masses of dough therein till they fall into the boxes of the series next below, a web following the contour of said belt and extended at one end to lie adjacent the open compartments as they pass from the upper to the lower run of the series, a feed belt adjacent the uppermost series of boxes and from which the dough may be delivered by hand to said boxes and a delivery belt adjacent the lowermost series of boxes on to which the masses of dough fall from said lower series substantially as described.

4. In a machine for the transport of dough the combination of a plurality of superposed endless series of dough receiving boxes lying transversely of the machine and each comprising a series of interconnected compartments having one common side wall and open at the top and remaining side, said boxes being so disposed that when following a straight course the open side of each box is closed by the side wall of the next, a belt arranged adjacent the lower run of certain series of inverted receiving boxes to retain the masses of dough therein until they drop into the boxes at the series next below, a web following the contour of said belt and extended at one end to lie adjacent the open compartments as they pass from the upper to the lower run of the series, a feed belt adjacent the upper series of boxes and from which the dough may be delivered by hand to said boxes, a slow speed delivery belt adjacent the lower series of boxes on to which the masses of dough fall from said lower series and a higher speed delivery belt on to which the masses are delivered from said slow speed belt, substantially as described.

5. In a machine for the transport of dough the combination of a plurality of superposed endless series of dough receiving boxes lying transversely of the machine and each comprising a series of interconnected compartments having one common side wall and open at the top and remaining side said boxes being so disposed that when following a straight course the open side of each box is closed by the side wall of the next, a belt arranged adjacent the lower run of certain of the upper series of inverted receiving boxes to retain the masses of dough therein until they drop into the boxes of the series next below, a web following the contour of said belt and extended at one end to lie adjacent the open compartments as they pass from the upper to the lower run of the series, means for driving the series of boxes in one direction and the belt and web in the opposite direction, a belt adjacent the upper series of boxes and from which the dough may be delivered by hand to said boxes, a slow speed delivery belt adjacent the lower series of boxes on to which the masses of dough fall from said lower series, a higher speed delivery belt onto which the masses are delivered from said slow speed belt, and means disposed above the series of boxes and the web for dusting the contents thereof substantially as described.

6. In a machine for the transport of dough the combination of two superposed endless series of dough receiving boxes lying transversely of the machine and each comprising a series of interconnected compartments having one common side wall and open at the top and remaining side said boxes being so disposed that when following a straight course the open side of each box is closed by the side wall of the next, a belt arranged adjacent the lower run of the upper series of inverted receiving boxes to retain the masses of dough therein until they drop into the lower series, a web following the contour of said belt and extended at one end to lie adjacent the open compartments as they pass from the upper to the lower run of the series, means of tensioning said web, a feed belt adjacent the upper series of boxes and from which the dough may be delivered by hand to said boxes, a slow speed delivery belt adjacent the lower series of boxes onto which the masses of dough fall from said lower series, a higher speed delivery belt onto which the masses are delivered from said slow speed belt, dusting boxes disposed above the series of boxes and the web, brushes within said boxes, a main driving shaft, and means operated therefrom for driving the series of boxes in one direction and the belt and web in the other direction, for driving the delivery belts at different speeds and for actuating the brushes in the dusting boxes substantially as described.

In witness whereof I have signed this specification in the presence of two witnesses.

GEORGE SAMUEL BAKER.

Witnesses:
H. D. JAMESON,
F. L. RAND.